Sept. 27, 1949.  E. B. PARKER  2,483,229
CIRCLE CUTTING MACHINE
Filed March 12, 1946  2 Sheets-Sheet 2
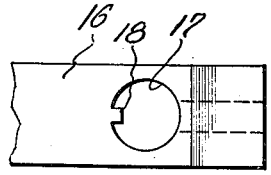
Fig. 6.
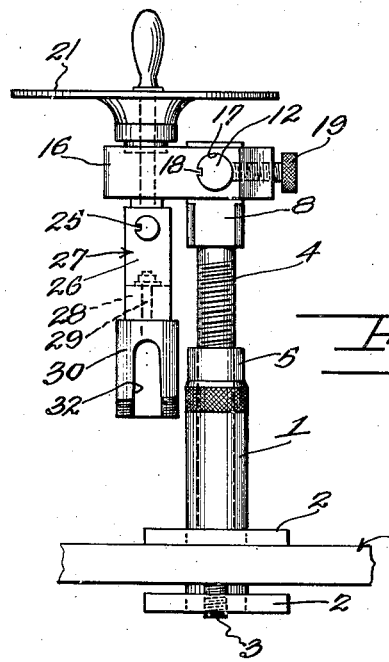
Fig. 7.
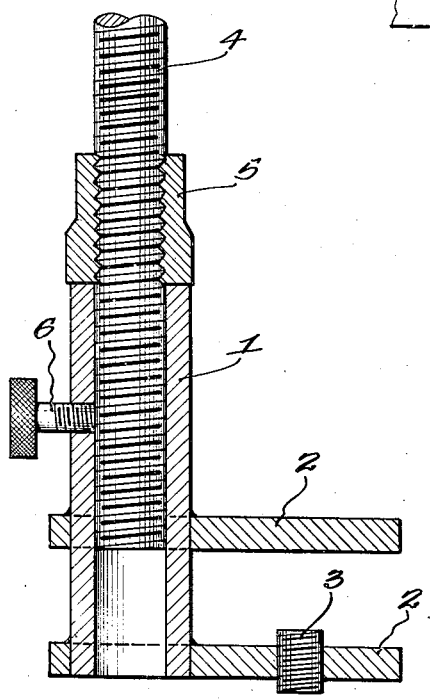
Fig. 3.
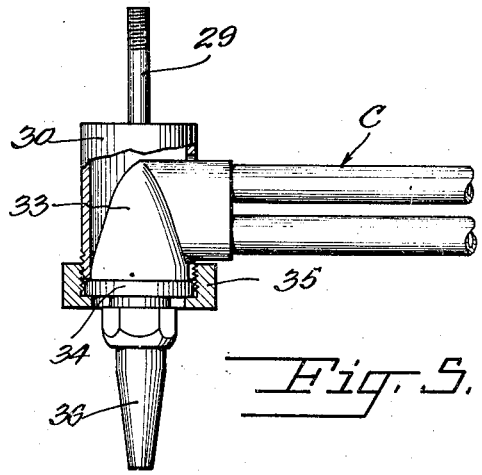
Fig. 5.
Inventor
Elbert B. Parker
Attorney Patented Sept. 27, 1949

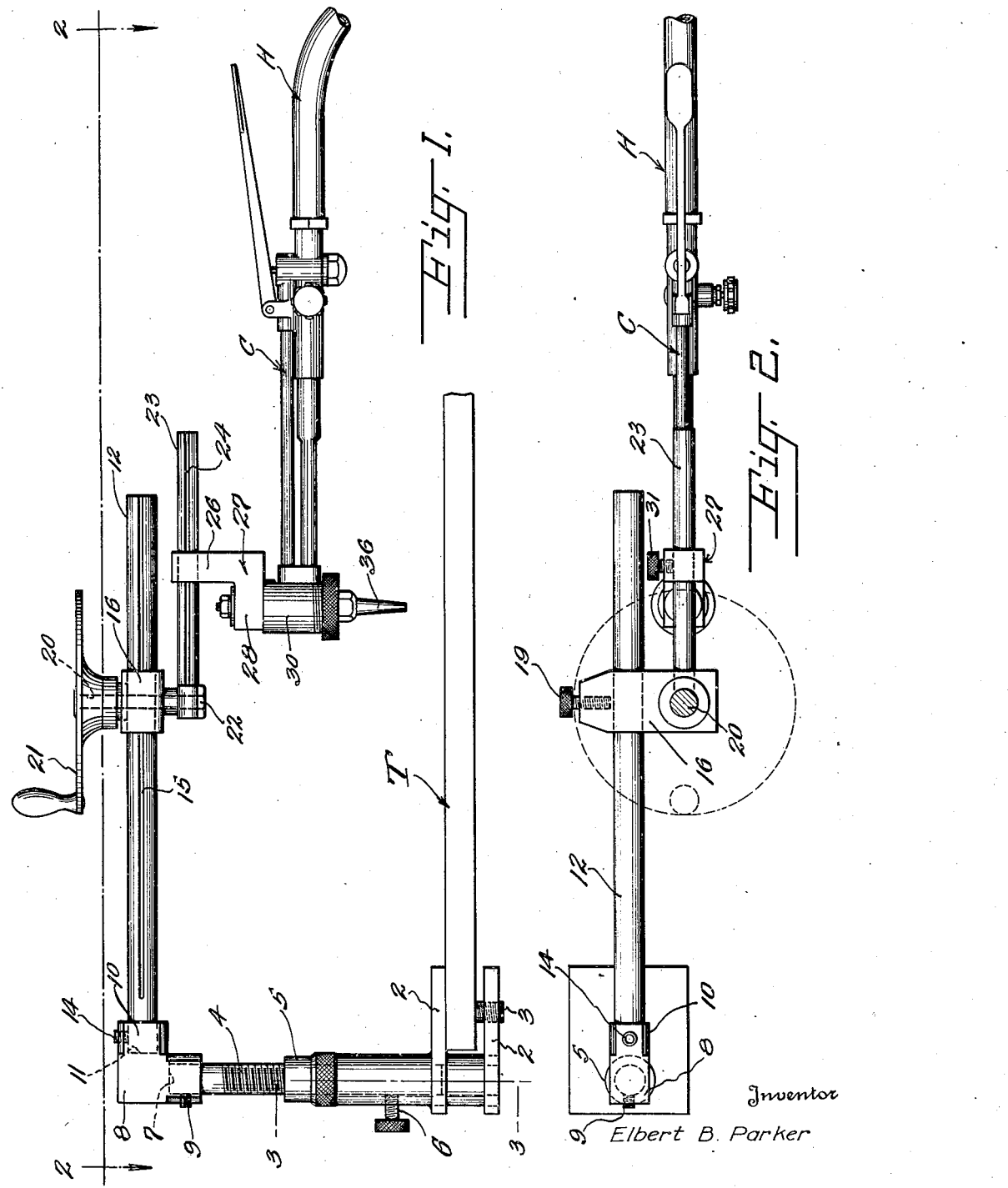

2,483,229

UNITED STATES PATENT OFFICE 2,483,229

CIRCLE CUTTING MACHINE

Elbert B. Parker, Oklahoma City, Okla.

Application March 12, 1946, Serial No. 653,814

1 Claim. (Cl. 266—23)

This invention relates to a cutting machine of a type particularly designed and adapted for use in connection with cutting torches and it is primarily an object of the invention to provide a machine of this kind which can be manually operated in a manner to effect cutting of a perfect circle on a selected radius within a given limit and whereby such cutting operation can be effected with the work in either a horizontal or vertical position.

Another and particular object of the invention is to provide a machine or apparatus of this kind which permits a torch to travel around a circle with only a slight forward and backward movement of the hose and wherein the machine or apparatus is of a character to be set from zero radius.

The invention also has for an object to provide a machine or apparatus of this kind which can be easily and readily moved from place to place and set in effective working position.

The invention consists in the details of construction and in the combination and arrangement of the several parts of my improved cutting machine whereby certain important advantages are attained, as will be hereinafter more fully set forth.

In order that my invention may be better understood, I will now proceed to describe the same with reference to the accompanying drawings, wherein:

Figure 1 is a view in elevation of a machine or apparatus constructed in accordance with an embodiment of the invention, with a cutting torch applied thereto;

Figure 2 is a view partly in section and partly in top plan of the machine or apparatus as illustrated in Figure 1, the section being on the line 2—2 of Figure 1;

Figure 3 is an enlarged fragmentary view taken substantially on the line 3—3 of Figure 1;

Figure 4 is a view in end elevation of the structure as illustrated in Figure 1, with the cutting torch omitted;

Figure 5 is an enlarged fragmentary view partly in section and partly in elevation illustrating the means herein embodied for holding the cutting torch to the machine or apparatus; and Figure 6 is an enlarged fragmentary view in elevation of the sliding block or carriage for the operating means.

In the embodiment of the invention as illustrated in the accompanying drawings, 1 denotes an elongated tubular supporting member of desired dimensions and which has rigid with one end portion thereof the elongated clamping plates 2 suitably spaced apart in a direction lengthwise of the member 1 and adapted to engage over the marginal portion of a bench top T or the like. One of these plates 2, preferably the lowermost, has threaded therethrough a clamping shank 3 whereby the member 1 may be detachably yet effectively mounted in desired working position.

Freely insertible from above within the member 1 is an elongated heavy duty threaded shank 4 upon which threads a sleeve 5 adapted to rest from above upon the upper or outer end of the member 1. The extent of projection of the shank 4 upwardly or beyond the member 1 may be readily regulated or controlled within certain limitations by adjusting the position of the sleeve 5 along the shank 4. After such adjustment has been effected, the shank 4 is effectively held against rotation by a binding screw 6 threading through the wall of the member 1 for contact with the adjacent portion of the shank 4 within the member 1.

The upper or outer end portion of the shank 4 is received within a socket 7 provided in the inner end of a head 8, as indicated by dotted lines in Figure 1. This head 8 is rigidly held upon the shank 4 by a binding screw 9 threading into the head 8 and bearing against the end portion of the shank 4 within the socket 7.

The outer portion of the head 8 is provided with a lateral extension 10 provided in its outer end with a socket 11, the axial center of which is at right angles to the axis of the shank 4. Extending within this socket 11 is an end portion of an elongated arm or bar 12 of material length and said arm or bar is rigidly held to the head 8 by the binding screw 14 threading into the head and having proper contact with the adjacent end portion of the arm or bar 12.

The arm or bar 12 throughout its major length is provided with a keyway 15 parallel to the axis of the arm or bar 12 and open at the outer end thereof. Slidably mounted upon the arm or bar 12 is an end portion of an elongated block or head 16, the bore 17 of which, through which the arm or bar 12 is disposed, having disposed along the wall thereof a key 18 which engages within the keyway 15 of the arm or bar 12.

This keyway 15 and key 18 are so positioned as to have the head or block 16 extend laterally from the arm or bar 12 at right angles thereto and also at right angles to the shank 4. Threaded axially through the shorter end of the head or block 16 is a binding screw 19 for clamping engagement with the portion of the arm or bar 12 within the bore 17 whereby the head or block 16 can be selectively adjusted as desired at any point along the arm or bar 12 as the requirements of practice may necessitate.

Freely disposed through the outer portion of the longer extremity of the head or block 16 is a shaft 20 having its axis parallel to the axis of the shank 4. Fixed to the shaft 20 is an operating member 21 for manual operation and the end portion of the shaft 20 below the head or block 16 is clamped, as at 22, to an end portion of a second elongated arm or bar 23 straight from end to end and at right angles to the shaft 20 which is also perpendicular to the arm or bar 12.

This arm or bar 23 is disposed along the major portion thereof with the keyway 24 open at the outer end of the arm or bar 23 and in which is received a key 25 rigid with an arm 26 of the torch-carrying head or block 27. This head or block 27 is herein disclosed as in the form of a reversed L with the bottom arm 28 thereof having disposed therethrough from below a shank 29 arranged at the axial center of a torch-holding box 30. This box 30 is herein disclosed as cylindrical in form and open at its lower end.

The connection between the box 30 and the head or block 27 is such as to have the axial center of the box 30 at right angles to the arm or bar 23. It is also to be pointed out that the keyway 24 in the arm or bar 23 and the key 25 are so arranged to assure the axial center of the box 30 being disposed in a direction to be at all times at right angles to the plane of the arm or bar 12.

The head or block 27 is adapted to be selectively adjusted as desired along the arm or bar 23 and to be held in such adjusted position by the clamping screw 31 threading into the arm 26 of the head or block 27 and having requisite contact with the adjacent portion of the arm or bar 23. By having the head or block 27 in the form of a reversed L, it will be readily noted that the box 30 may be adjusted from O with respect to the axial center of the shaft 20 and outwardly therefrom as may be permitted by the length of the arm or bar 23.

The side wall of the box 30 is provided at a desired point thereon with a slot 32 open at the lower or open end of the box 30 whereby is permitted the ready application within the box 30 of the head 33 of the cutting tool C which is of a conventional type. This head 33 is provided with a surrounding flange 34 for contact with the outer or free edge of the box 30 and is clamped thereagainst by a conventional cap nut 35. This nut 35, of course, has a central opening to permit the desired passage therethrough of the nozzle 36 of the head 33, said nozzle 36 having its axial center at right angles to the plane of the arm or bar 12.

The cutting tool C has associated therewith the usual supply hose H and at this time it is to be particularly pointed out that during the operation of the machine or apparatus as the result of the swinging of the arm or bar 23, the hose H will only be slightly adjusted or shifted and at no time in excess of the radius of the circular cut made by the cutting torch.

It is believed to be readily apparent from the foregoing that the machine or apparatus as herein embodied may be readily employed with plates in horizontal or vertical position and that the radius of the cut may be readily and conveniently varied within certain limitations as determined by the length of the arm or bar 23, and it is believed to be further apparent that the proper placing of the cutting torch with respect to the work is materially facilitated by the ready adjustment of the head or block 16, or carriage as it may be called, along the arm or bar 12.

It is to be particularly pointed out that the apparatus or machine, as herein disclosed, is readily portable and may be quickly and easily mounted in effective working position. It is to be further particularly noted that the machine or apparatus is one which can be easily operated manually through the medium of the operating member 21 without in any way affecting the efficiency of the machine or apparatus.

It is also believed to be apparent that the machine or apparatus, as herein embodied, is one in which its operation is in no way handicapped by the interference of the welding hose, and it is also thought to be further apparent that the machine or apparatus is of particular advantage as the torch can be set from O out which is not possible with the machines or apparatus of a similar character now generally in use.

While I have hereinbefore referred to the box 30 for holding the head 33 of the cutting torch, it is to be stated that this may also be termed an adapter and, in practice, an adapter should, of course, be machined to readily receive or accommodate the particular type of cutting head with which it is associated. The mounting of the box or adapter 30 is such as to permit its ready application or removal.

From the foregoing description it is thought to be obvious that a cutting machine constructed in accordance with my invention is particularly well adapted for use by reason of the convenience and facility with which it may be assembled and operated.

I claim:

A hand operated cutting machine designed to be moved from place to place and comprising a relatively long support arm adapted to be detachably mounted upon and in parallel relation with a work supporting surface, a relatively long head having said arm extending transversely through one end thereof for sliding movement on the arm, a shaft extending through the head adjacent to the other end in perpendicular relation to the arm, the shaft being turnable in the head, a hand crank connected with the upper end of the shaft for turning the latter, an arm secured to the lower end of the shaft in substantially perpendicular relation thereto, a block in the form of an L and having two angularly related arms, one of said block arms having the second mentioned arm slidably extended transversely therethrough whereby the block is suspended from and may be shifted longitudinally on the second arm, the other block arm being parallel to the second arm and disposed to be shifted to a position directly in line with said shaft, a pivot member secured to the second arm and adapted to be brought into alignment with the shaft, means connected with the pivot member for supporting the head of a cutting tool, the said cutting tool supporting means comprising a shell housing having a side wall recess, the housing being open at one end through which the recess opens, the said pivot extending from the other end of the housing through the said other block arm, and means threaded on the open end of the housing for covering the open end of the recess and for securing the cutting tool head in the housing.

ELBERT B. PARKER.

REFERENCES CITED

The following references are of record in the file of this patent:

UNITED STATES PATENTS

| Number | Name | Date |
|---|---|---|
| 1,176,584 | Madgett | Mar. 21, 1916 |
| 1,348,363 | Kilts | Aug. 3, 1920 |
| 1,748,870 | Eberle | Feb. 25, 1930 |
| 2,107,396 | Schoitz | Feb. 8, 1938 |
| 2,296,480 | Nicolai | Sept. 22, 1942 |
| 2,321,949 | Sorensen | June 15, 1943 |
| 2,377,844 | Stone | June 5, 1945 |

FOREIGN PATENTS

| Number | Country | Date |
|---|---|---|
| 241,681 | Great Britain | Oct. 29, 1925 |